United States Patent Office.

WILLIAM H. WOOD AND JOHN H. STEVENS, OF NEWARK, N. J., ASSIGNORS TO THE CELLULOID MANUFACTURING COMPANY, OF NEW YORK, N. Y.

APPLICATION OF CELLULOID FOR ENAMELING TEXTILE FABRICS, &c.

SPECIFICATION forming part of Letters Patent No. 297,098, dated April 15, 1884.

Application filed March 11, 1884. (No specimens.)

*To all whom it may concern:*

Be it known that we, WILLIAM H. WOOD and JOHN H. STEVENS, citizens of the United States, and residents of Newark, in the county of Essex and State of New Jersey, have invented certain new and useful Improvements in the Application of Celluloid for Enameling Textile Fabrics, Leather, Wood, and other Materials, of which the following is a specification.

The invention has relation to improvements in enameling textile fabrics, leather, wood, paper, and other materials; and it consists in the novel application of a sheet of celluloid, or analogous material the base of which is pyroxyline, to a backing or foundation of any desired character.

It has heretofore been customary to apply a thin solution of pyroxyline material upon a backing or foundation, and also to effect the adhesion of a sheet of pyroxyline material to a backing or foundation by employing an agent which softens the sheet of pyroxyline material or causes the solvents contained in the same to become active while in contact with the backing or foundation, by which means the two are united. The results produced by these means are not, however, free from objection. A necessary consequence of the treatment last mentioned is to so affect the sheet that upon being dried after it has been applied it contracts, whereby the value of the finished product is impaired. By our process we are enabled to avoid the objections which have been involved in the methods heretofore practiced and to produce a better result.

The distinctive novelty of our process consists, chiefly, in the fact that we make use of a cement which is dried before the sheet or veneer of pyroxyline is applied, and contains nothing which can soften or combine with the pyroxyline—that is to say, we first apply upon the backing or foundation a cement or adhesive agent and dry it, whereby it is securely attached to the backing or foundation, and then apply the sheet or veneer of pyroxyline compound and effect the union of the two. In regard to the kinds of cements or adhesive agents which may be successfully employed, we would state that almost any substance containing an oxidizable or drying oil which, when dry, is so acted upon by heat and pressure as to become adhesive may be used with good results, the essential conditions being that the temperature at which the heat and pressure affect the cement shall be about or below the temperature required to polish the sheet of pyroxyline material while in contact with a smooth metallic surface, and also such that the hardened cement will be of sufficient elasticity and toughness to stand the necessary wear.

The invention may be practiced in connection with the enameling of almost any kind of surfaces. Indeed, we know of no substance or material in connection with which it cannot be to some extent utilized, if the surface be of such a character that heat and pressure can be applied. We contemplate, however, practicing the invention chiefly in connection with materials such as textile fabrics, leather, wood, paper, and the like.

Having prepared a backing by applying the cement and thoroughly drying it, we take a sheet of the pyroxyline compound of suitable size and thickness, and after placing the sheet upon the surface of cement subject the two to heat and pressure in a hydraulic or other press between steam-tables, or in any other convenient way; but the heat and pressure may be applied in other ways, according to circumstances, as may be convenient. When we desire a fine finish, we use a polished metal plate on one side of the sheet or veneer of pyroxyline material, so as to polish the pyroxyline surface. The plate may be embossed or otherwise constructed, so that the union of the pyroxyline sheet and backing or foundation and the polishing or embellishing of the pyroxyline surface may be accomplished at a single operation. After the pyroxyline sheet and backing have been subjected to heat and pressure, as aforesaid, it will be found that they will be firmly united, and that the product will be in a finished condition, substantially ready for the market. In cases where materials or substances which are not in sheet form are to be treated, provision will be made for the application of heat and pressure according to circumstances.

The enameling of wood may be very successfully accomplished, particularly by using a translucent cement—such as transparent cloth enamel, as well as a translucent pyroxyline sheet. A suitable varnish containing oxidizable or drying oil is applied upon the wood and baked or dried, according to the requirements of the case, and the sheet or veneer of pyroxyline material pressed upon it, the polishing-plate being used, if desired, to give a finish. In this way very fine effects may be accomplished.

Among the most desirable ways of practicing our invention may be mentioned the following: We take a piece of oil-cloth, (and by "oil-cloth" we mean not only what is commonly called "oil-cloth," but also cloth which has been enameled or japanned, of any description, adapted to the purpose for which our finished cloth is intended to be used,) together with a sheet of pyroxyline compound of a proper size, shape, and thickness, and subject the two to pressure in a die, or in any other convenient way unite them by heat and pressure. Any of the ordinary kinds of patent or japanned leather can also be treated in the same way and successfully used with entirely satisfactory results.

If preferred, the cement or adhesive agent may be applied to the sheet or veneer of pyroxyline material and permitted to dry, and the adhesion effected by placing the dried surface in contact with the surface to which it is desired to attach the pyroxyline sheet or veneer, and heat and pressure then applied, as hereinbefore set forth; or a thin coating of cement can be applied to both the article or surface to be enameled and the sheet of pyroxyline material, and dried and attached as stated. By this means the coat of cement, being thin, dries more rapidly than when applied to but one of the surfaces in a thicker coating.

The fundamental essential in our process is that the cement or adhesive agent contain an oxidizable oil, (for instance, boiled linseed-oil,) and that it be dried before it is employed to effect the functions for which we use it.

By preference, the sheet of pyroxyline material will be as thoroughly seasoned as may be practicable—that is to say, it will be by preference in the condition in which a sheet of pyroxyline compound is when a very large percentage of the solvents have left it. We think it very desirable that seasoned materials shall be used, as the results are more satisfactory; but at the same time the invention may be successfully practiced even where the material has been seasoned to only a very limited extent; and we do not, therefore, limit our claim to the use of seasoned material.

It is obvious that it is not essential that the backing or foundation shall be prepared for the express purpose for which it is to be used. There are many objects which are in a condition to be employed successfully as backings or foundations—such, for instance, as the oil-cloth previously referred to. All such articles may, of course, be utilized the same as those which have been coated and the coating then dried, as hereinbefore set forth.

Very desirable effects may be produced by applying translucent or tinted sheets or veneers upon figured, ornamented, or embellished backings or grounds. By "translucent" we do not mean a material which is necessarily colorless. Not only may such materials be used, but semi-opaque or tinted materials which are partly transparent may be used, whereby a great variety of effects can be produced, the number of such effects being unlimited.

In describing our process we have pointed out different methods whereby it may be availed of; but we do not limit ourselves to any specific method of giving effect to our discovery. The different methods to which we have referred will be practiced according to circumstances, with a view to the effectuation of the particular object to be attained and the character of the surface or material upon which the sheet or veneer is to be secured.

Having thus described our invention, what we claim as new, and desire to secure by Letters Patent, is—

1. The within-described process of enameling, which consists in causing the adhesion to the surface to be enameled of a sheet of material the base of which is pyroxyline, by, first, coating the surface with a suitable cement containing an oxidizable or drying oil; second, drying the cement, and, third, attaching the pyroxyline sheet by heat and pressure.

2. The within-described process of enameling, which consists in, first, coating one of the surfaces of the pyroxyline sheet or veneer with a suitable cement containing an oxidizable or drying oil; second, drying the cement, and, third, attaching the pyroxyline sheet by the application of heat and pressure, substantially as set forth.

3. The within-described process of enameling, which consists in, first, coating the surface to be enameled with a suitable cement containing an oxidizable or drying oil; second, drying the cement, and, third, attaching a sheet of seasoned material the base of which is pyroxyline, substantially as set forth.

4. The method of enameling material in the form of sheets hereinbefore described, which consists in causing the adhesion of a sheet of material the base of which is pyroxyline to enameled cloth or oil-cloth, by bringing the pyroxyline sheet in contact with the coated surface of the enameled cloth or oil-cloth, and subjecting the two to heat and pressure, substantially as described.

5. The method of enameling material in the form of sheets hereinbefore described, which consists in, first, coating one of the surfaces of a sheet of pyroxyline material with a suitable cement; second, drying the cement, and, third, effecting the adhesion of the pyroxyline sheet or veneer to the surface to be enameled by the application of heat and pressure, substantially as described.

6. The process herein described of enameling cloth, leather, or textile fabrics by means of sheets or veneers of pyroxyline material, which consists in effecting the adhesion of the sheet or veneer of pyroxyline material by subjecting it to heat and pressure while in contact with a dried surface of a cement containing oxidizable or drying oil.

Signed at New York, in the county of New York and State of New York, this 8th day of March, A. D. 1884.

WILLIAM H. WOOD.
JOHN H. STEVENS.

Witnesses:
CHAS. C. GILL,
HERMAN GUSTOW.